May 29, 1928.
C. B. CARVER
1,671,667
RIM CONTRACTING TOOL
Filed April 28, 1925
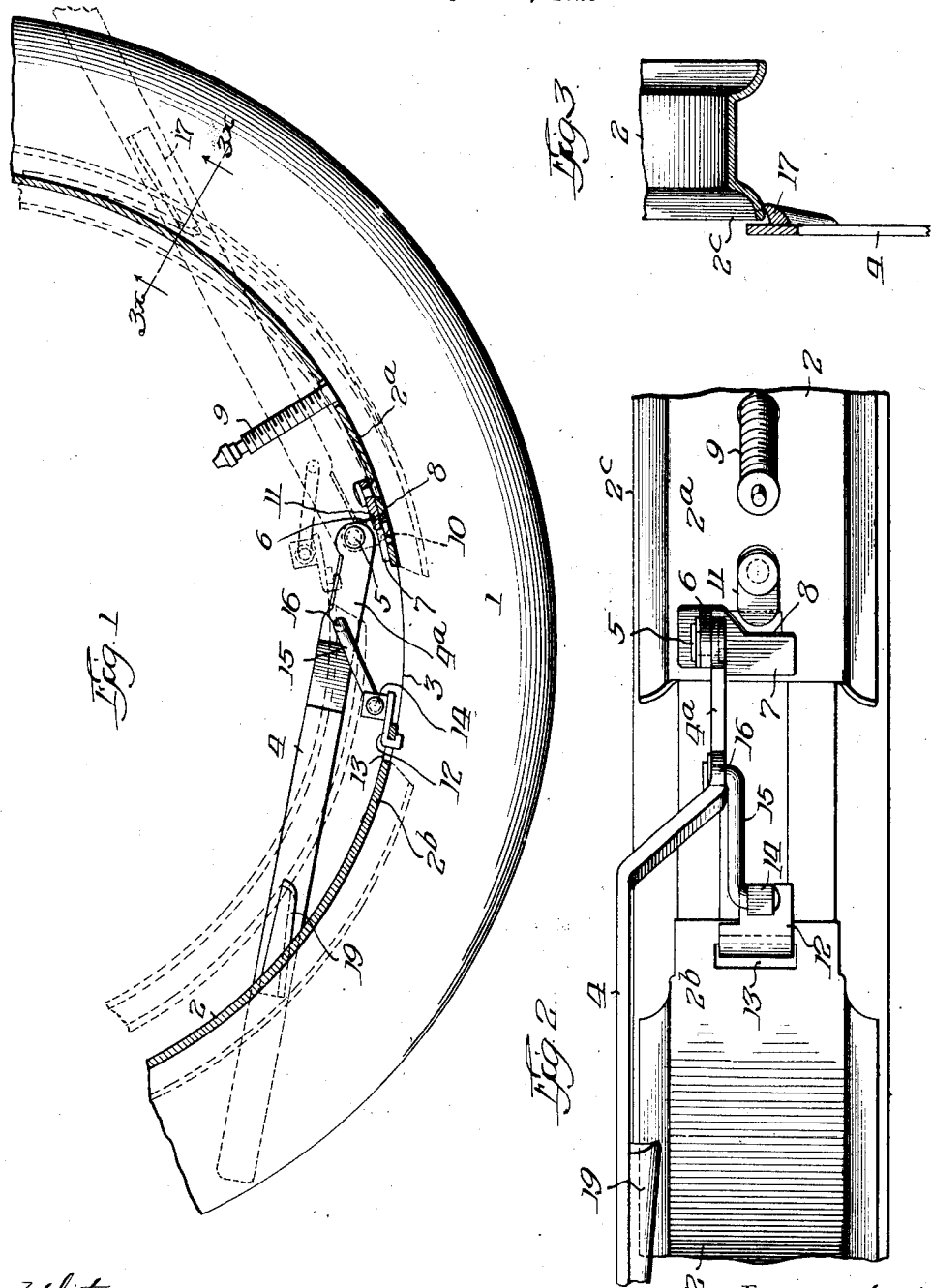
Inventor
Charles B. Carver Patented May 29, 1928.

1,671,667

UNITED STATES PATENT OFFICE.

CHARLES B. CARVER, OF ELK RAPIDS, MICHIGAN.

RIM-CONTRACTING TOOL.

Original application filed July 28, 1923, Serial No. 654,311. Divided and this application filed April 28, 1925. Serial No. 26,337.

This invention relates to a tool for use in connection with rims for the tires of wheels, for instance, pneumatic tires, which rims, for the sake of facilitating introduction into and removal from the tires, are split or rendered collapsible.

This application is a division of application, Serial No. 654,311, filed July 28, 1923, for Letters Patent for demountable rims, which said application has become U. S. Letters Patent No. 1,535,398, dated April 28, 1925. The tool herein described and claimed is designed primarily for use in the manipulation of a rim constructed and functioning substantially as described in said Letters Patent, but it may be used in connection with rims of other construction and operation.

The object of the present invention is to provide a contracting tool for tire rims of the contractile type, and the invention proceeds upon the principle of so constructing the tool that it will be adapted to establish a stepping bearing on one end of the split rim and a lifting connection with the other end thereof, then, by the manipulation of a controlling lever, may perform the function of lifting the one end relatively to the other, while drawing the two ends together to contract the rim, the controlling lever being preferably equipped for such engagement with the contracted rim as will serve to hold the tool in contracting position until it may be desired to release the rim for re-expansion under its inherent resiliency. The invention resides in the novel features of construction and operation substantially as hereinafter described and as particularly pointed out in the claims.

In the accompanying drawing—

Figure 1 shows, in sectional elevation, a portion of a split tire rim with a tire thereon, and the tool constituting the subject-matter of the present invention assembled in operative relation thereto, the positions of the parts previous to contraction of the rim being shown in full lines, and the positions incident to complete contraction as well as the interlock of the controlling lever with the contracted rim being shown in dotted lines.

Figure 2 is a plan view of parts shown in Figure 1 and with the tool in the position shown in full lines therein.

Figure 3 is a sectional view on the line $3^x$—$3^x$ of Figure 1, showing the means for releasably interlocking the controlling lever with the rim when the parts are in contracted position.

1 represents a pneumatic tire, and 2 a rim adapted for use in connection therewith, in accordance with established practice, said rim being adapted to be collapsed or contracted in dimension in order to facilitate its introduction within or removal from the tire, to which end the rim is split transversely at some suitable point in its circumference, for instance, as shown at 3. The particular construction of rim 2, in connection with which the present invention is illustrated, involves, in addition to the mere feature of the split, the structural feature of a removable segment as described and claimed in the Letters Patent above identified, so that the opening 3 is of substantial circumferential dimension; but while the tool of the present invention is well adapted for contracting a rim of this construction, it is obviously not limited in its application to such a rim, but might be used in connection with other rims by the mere expedient of properly locating the stepping bearing for the lever and the opening for connecting the pick-up link which characterize the tool now to be described.

4 represents a contracting lever pivoted at 5 to a fulcruming step 6 which is provided with a stepping base 7 adapted to enter a recess 8 in the end $2^a$ of the rim somewhere near the split 3, thereby establishing an immovable fulcrum for the lever 4 upon one end of the rim in such relation to the tire as will minimize the tendency of the rim to creep relatively to the tire and distort the inflating stem 9 in the process of contraction and expansion of the rim within the tire. The portion of the stepping base 7 that receives the step 6 is preferably offset laterally from the part that enters the recess 8, so that said base will impose the load of the lever directly upon the inner face of the rim and present an offset portion 10 for the reception of a turn-button 11, such as is usually provided at the end of the split rim for the purpose of holding the meeting portions of the rim in circumferential alignment. Lever 4 is further equipped with means for engaging and lifting the other end of the rim, which means is preferably in the nature of a hook 12, herein called a face-hook, because, while adapted to enter a recess 13 formed radially through the end of the rim, its members embrace the inner and outer faces of the rim and bind the hook not only against displacement but against pivotal action, and better adapt the hook to deflect the moving ends of the rim inward; and this face-hook 12 is pivotally connected at a point 14 remote from the recess 13, to a link 15 which is in turn swiveled at 16 to the lever 4. Link 15 and the end 4ª of the lever 4, when connected with the respective ends of the rim, are adapted to act as a toggle, one end of which has a fixed fulcrum, and the other end of which has a lifting connection; this toggle functions in a manner to lift the end 2ᵇ of the rim 2 as the lever 4 is swung from the full line position to the dotted line position shown in Figure 1, and at the same time contract the rim sufficiently to facilitate its withdrawal from and return to a tire. In order to lock the lever 4 in the dotted line position of Figure 1 and thereby hold the rim in contraction, said lever is provided with an undercut lug 17, rigidly united therewith at an intermediate point in its length and with a presentation of the undercut that adapts the lug to engage the flange 2ᶜ of the rim and to be brought into such engagement by continuing radius movement of the lever until the lug passes the rim flange, and then deflecting the lever laterally to engage the lug behind the flange, whereupon, the lug will be automatically held in locking position by the resiliency of the implement, and the rim and the portion of the lever which lies outwardly beyond the lug will not only serve as the means for moving the lug into and out of interlock with the rim, but will remain as a handle to assist in passing the rim into and out of the tire. With the rim contracted and held in this position, it can be conveniently handled as a unit in assembling it with or disassembling it from a tire; and when returned to the tire, the rim may readily be released for expansion within the tire by merely springing the lever 4 sideways sufficiently to disengage lug 17 from flange 2ᶜ. The location of the recesses 8 and 13 will, of course, be selected to insure the proper throw of the lifted and retracted end of the rim relatively to the stationary end. These recesses are shown practically at the ends of the rim in the present instance because of the particular construction of rim selected for purposes of illustration.

I claim:

1. In a rim contracting tool the combination of a handle pivoted to a fulcrum base, said base having a flat portion for entering a portion of a rim in a radial direction and adapted to be secured by locking means, and a hook facing said fulcrum base for radial engagement with another portion of the rim and connected to said lever for pulling said portion of the rim to contract said rim.

2. In a rim contracting tool the combination of a handle bent to clear said rim, said handle being pivoted to a fulcrum base, said base having a flat portion for entering a slot in a rim in a radial direction and for being locked in rim engaging positon by locking means on said rim, a hook disposed toward said fulcrum base for radial engagement with another slot in the rim and connected to said lever for pulling said portion of the rim to contract said rim, and an abutment on said handle for engagement with the rim to hold said rim in contracted position.

Signed at Elk Rapids, Michigan.

CHARLES B. CARVER.